US012662091B2

(12) United States Patent
Koswatta Liyanage

(10) Patent No.: US 12,662,091 B2
(45) Date of Patent: Jun. 23, 2026

(54) VEHICLE EMERGENCY BRAKING SYSTEM AND METHOD

(71) Applicant: Chanaka Irosh Koswatta Liyanage, Tomball, TX (US)

(72) Inventor: Chanaka Irosh Koswatta Liyanage, Tomball, TX (US)

( * ) Notice: Subject to any disclaimer, the term of this patent is extended or adjusted under 35 U.S.C. 154(b) by 0 days.

(21) Appl. No.: 18/743,977

(22) Filed: Jun. 14, 2024

(65) Prior Publication Data

US 2025/0263050 A1      Aug. 21, 2025

Related U.S. Application Data

(60) Provisional application No. 63/554,045, filed on Feb. 15, 2024.

(51) Int. Cl.
B60T 1/14 (2006.01)

(52) U.S. Cl.
CPC ...................................... B60T 1/14 (2013.01)

(58) Field of Classification Search
CPC ... B60T 1/14; B60T 13/22; B60T 3/00; B60T 2201/022; B60T 8/00
See application file for complete search history.

(56) References Cited

U.S. PATENT DOCUMENTS

| | | | | |
|---|---|---|---|---|
| 1,287,483 A | * | 12/1918 | Na | B60T 1/14 188/5 |
| 1,583,529 A | * | 5/1926 | Coleman | B60T 1/14 188/5 |

| | | | | |
|---|---|---|---|---|
| 2,687,191 A | * | 8/1954 | Shannon | B60T 1/14 188/234 |
| 2,871,986 A | * | 2/1959 | Polovitch | B60T 1/14 188/5 |
| 2,886,139 A | * | 5/1959 | Wilson | B60T 1/14 188/5 |
| 3,043,402 A | * | 7/1962 | Stephenson | F16D 49/16 188/29 |
| 3,994,352 A | * | 11/1976 | Siorek | B62D 55/116 188/110 |
| 6,401,876 B1 | * | 6/2002 | Boros | B60T 1/14 188/32 |
| 2008/0308328 A1 | * | 12/2008 | Kejha | B60L 15/2045 180/243 |

(Continued)

FOREIGN PATENT DOCUMENTS

| | | | |
|---|---|---|---|
| CN | 1328097 C | * | 7/2007 |
| CN | 101584912 A | * | 11/2009 |
| DE | 3401563 A1 | * | 7/1985 |

(Continued)

*Primary Examiner* — Robert A. Siconolfi
*Assistant Examiner* — Mahbubur Rashid
(74) *Attorney, Agent, or Firm* — Curtis W. Lockhart; Lockhart IP

(57) ABSTRACT

A vehicle emergency braking system and method is provided. The braking system includes hydraulic cylinders mounted on an undercarriage of a vehicle with brake pads configured to extend and retract via hydraulic pumps and a control switch powered by a power source. The brake pads can extend down until in contact with a road surface to stabilize and/or stop the vehicle in the event extra stopping power is required such as during an emergency or if the vehicle loses traction on an icy road.

9 Claims, 7 Drawing Sheets

(56)      References Cited

U.S. PATENT DOCUMENTS

2011/0198161 A1 *  8/2011  Lomazzo .................. B60T 1/14
                                                    188/5
2016/0052493 A1 *  2/2016  Rydsmo ................... B60T 1/14
                                                    188/5

FOREIGN PATENT DOCUMENTS

JP          06080061  A  *  3/1994
KR          970040418  A  *  7/1997
KR        20220000040  A  *  1/2022
RU          2079005  C1 *  5/1997

* cited by examiner

103

105

201

205

209

203

207

VEHICLE EMERGENCY BRAKING SYSTEM AND METHOD

CROSS-REFERENCE TO RELATED APPLICATION

This application claims the benefit of U.S. Provisional Patent Application No. 63/554,045, filed Feb. 15, 2024, which is incorporated by reference herein in its entirety.

COPYRIGHT AND TRADE DRESS NOTICE

A portion of the disclosure of this patent document contains material that is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND

1. Field of the Invention

The present invention relates generally to vehicle safety systems, and more specifically, to an emergency braking system designed to enhance the stopping capability of vehicles under slippery road conditions.

2. Description of Related Art

This background information is intended to further educate the reader as to additional aspects of the prior art and may present examples of specific aspects of the prior art that is not to be construed as limiting the disclosure of the present application.

Driving on slippery roads, whether due to rain, ice, snow, or other similar conditions, significantly increases the risk of vehicular accidents. The inherent danger in such conditions is exacerbated by the limitations of conventional braking systems, which may not provide sufficient stopping power or control to prevent skidding or sliding. This issue poses a considerable safety risk, leading to accidents that can result in severe injuries or fatalities.

Traditional methods to address slippery road conditions include the application of salt or other deicing materials, as well as mechanical snow removal. While these approaches can mitigate the risk to some extent, they are reactive rather than preventative measures and often cannot be implemented quickly enough to prevent accidents. Moreover, these methods do not directly enhance a vehicle's ability to stop under adverse conditions, leaving a critical safety gap during the time drivers are most vulnerable.

The inadequacy of standard vehicle braking systems to cope with the challenges presented by slippery roads necessitates an innovative solution. Existing systems primarily rely on the vehicle's mechanical braking mechanism, which, when faced with reduced traction, can fail to stop the vehicle promptly, if at all. This limitation has highlighted the need for an emergency braking system specifically designed to function effectively under such hazardous conditions.

Accordingly, there is a need for an emergency braking system that can be deployed rapidly in response to slipping or skidding, providing drivers with a means to significantly reduce stopping distances and thereby mitigate the risk of accidents. Such a system would ideally be adaptable to existing vehicles, offering a retrofit solution that enhances safety without requiring comprehensive modifications to the vehicle's standard braking system.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

The present invention addresses the aforementioned deficiencies by providing an emergency braking system specifically designed to enhance vehicle safety during hazardous road conditions such as ice, snow, or rain, where traditional braking systems are less effective. This innovative system offers a significant improvement in stopping capability, thereby reducing the likelihood of accidents and enhancing driver and passenger safety.

The core objective of this invention is to introduce an emergency braking mechanism that can be activated instantly in response to slippery conditions, effectively reducing the vehicle's stopping distance when the conventional braking system is inadequate. This is achieved through one or more electrical hydraulic cylinders which, upon activation, extend one or more brake pads directly onto the road surface, thus providing immediate additional stopping power.

Key features of the emergency braking system include: a brake engage button accessible to the driver for quick engagement of the emergency braking system. Upon pressing this button, the one or more electrical hydraulic cylinders extend the one or more brake pads towards the ground, creating friction that aids in stopping the vehicle promptly.

The brake pads are constructed from a material that is durable and effective in creating stopping friction without damaging the road surface or the vehicle itself.

The system also includes a brake disengage button for disengaging the brake pad, retracting the brake pad back into its initial position, allowing the vehicle to resume normal operation.

The system is powered by one or more electrical hydraulic pumps, supported by a network of hydraulic hoses, steel washers, grease, pins and bushes, and a mounting system that includes brackets for securing the mechanism to the vehicle.

The system may further include safety features such as a warning light and alarm to alert the driver when the emergency braking system is engaged or if there is a system malfunction.

The entire system is designed to be retrofittable on existing vehicles without the need for extensive modifications to the vehicle's standard braking system. It includes all necessary components such as plastic pads covered with a metal coating with steel spikes, wires, fusers, relay, solenoid fuse, hydraulic oil, and a power source such as a 12V battery.

The emergency braking system of the present invention thus provides a reliable and effective solution to enhance vehicle safety in conditions where traditional braking systems may fail. It is a versatile system that can be adapted to various vehicle types, offering a practical safety enhancement for a wide range of drivers.

BRIEF DESCRIPTION OF THE DRAWINGS

The accompanying drawings, which are incorporated in and constitute a part of this disclosure, illustrate exemplary aspects and, together with the description, serve to explain the disclosed principles. Some aspects of system and/or methods in accordance with aspects of the present subject matter are now described, by way of example only, and with reference to the accompanying Figures, in which.

Figure 1:
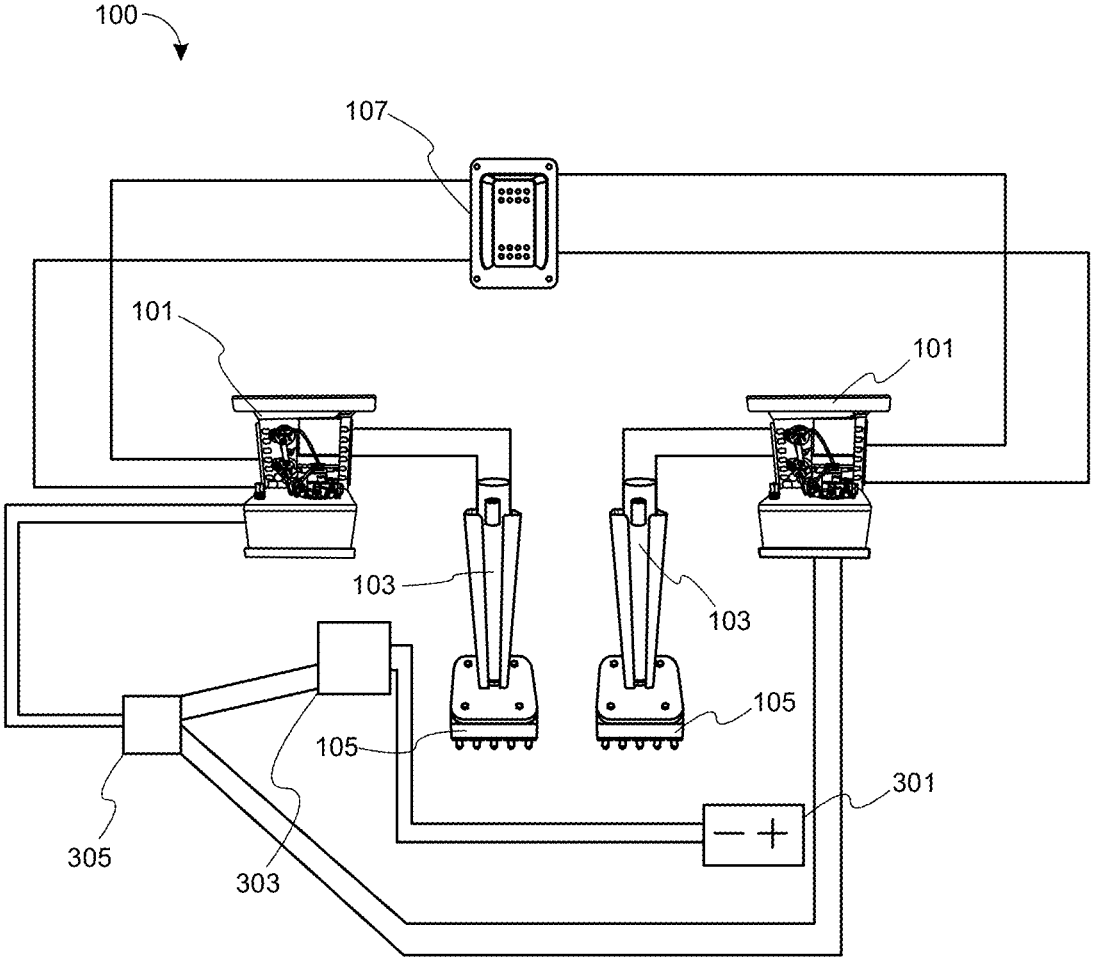
FIG. 1 illustrates an exemplary schematic of a vehicle emergency braking system, in accordance with an aspect of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The detailed description of the invention is provided to ensure that any person skilled in the art can make and use the invention and is provided in the context of its preferred embodiments, which are illustrative and not restrictive.

The invention of the present disclosure pertains to an emergency braking system designed to enhance vehicular safety by providing additional stopping power under slippery road conditions such as ice, snow, or heavy rain. This system is uniquely engineered to offer a rapid response mechanism that can be activated by the driver to immediately engage additional brake pads, thereby reducing the vehicle's stopping distance when the main braking system is compromised due to adverse conditions.

Referring now to FIG. 1, the emergency braking system, designed to provide enhanced safety and stability during critical situations, integrates multiple components to achieve rapid and controlled braking. At the core of the system are one or more electrical hydraulic pumps 101. These hydraulic pumps 101 generate hydraulic pressure to actuate the braking mechanism. The hydraulic pumps 101 are electrically powered, ensuring quick and reliable operation.

Figure 2:
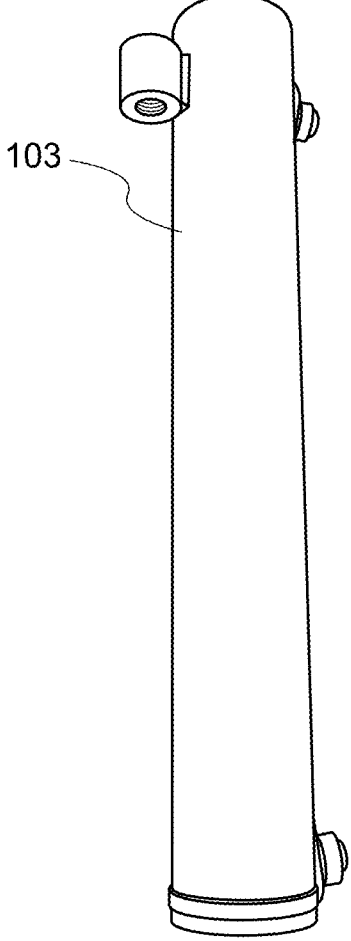
FIG. 2 illustrates an exemplary hydraulic cylinder, in accordance an aspect of the present disclosure.

Connected to the electrical hydraulic pumps 101 are one or more hydraulic cylinders 103 as shown in FIG. 2. These hydraulic cylinders 103 convert the hydraulic pressure from the pumps 101 into mechanical force. When the braking system is activated, the hydraulic pumps 101 deliver high-pressure hydraulic fluid to the hydraulic cylinders 103. This fluid exerts pressure on the pistons inside the hydraulic cylinders 103, causing them to extend.

Figure 3:
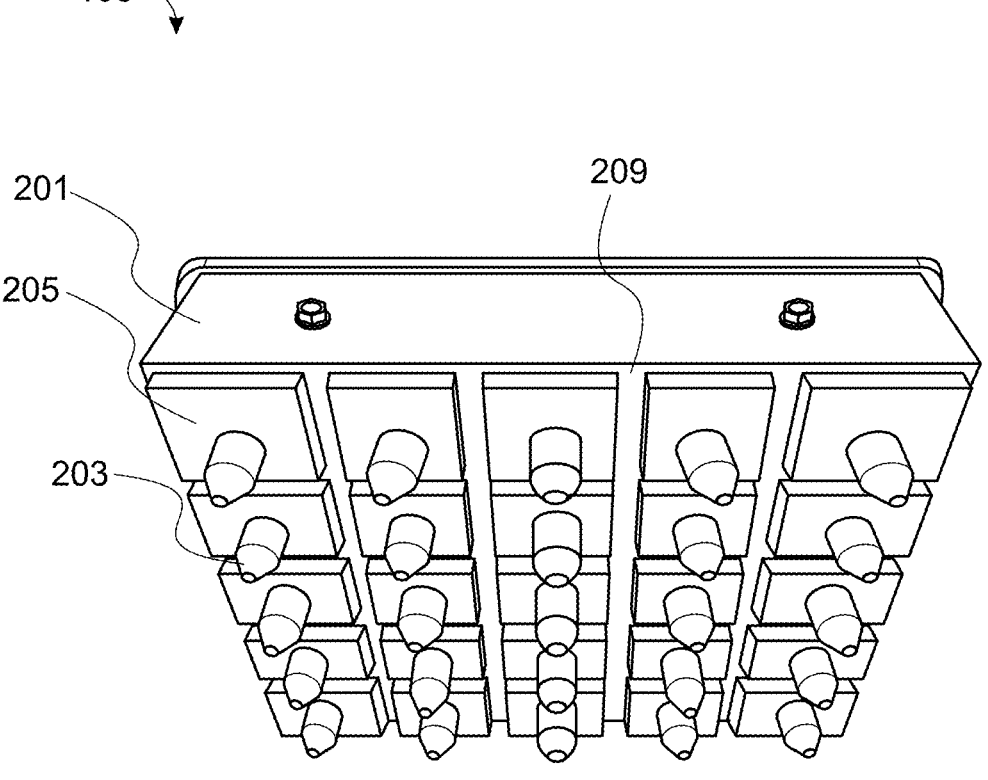
FIG. 3 illustrates an exemplary brake pad, in accordance with an aspect of the present disclosure.

The extension of the hydraulic cylinders 103 triggers the movement of one or more brake pads 105 as shown in FIG. 3. The brake pads 105 are attached to extendable ends of the hydraulic cylinders 103 and are designed to make contact with the ground. As the hydraulic cylinders 103 extend, the brake pads 105 move outward, increasing the surface area in contact with the ground. This increased friction generates the necessary braking force to slow down or stop the vehicle.

The retraction of the brake pads 105 occurs when the braking system is deactivated. This is achieved through a control switch 107, which initiates the process of reducing hydraulic pressure in the system. As the pressure decreases, the pistons in the hydraulic cylinders 103 retract, causing the brake pads 105 to move away from the ground. This disengagement of the brake pads 105 allows the vehicle to resume normal movement without hindrance.

The one or more brake pads 105 are an integral component of the braking system and are made from a material specifically selected to ensure effective friction without causing damage to the road surface or the vehicle. The pads are designed to provide maximum stopping power when engaged. The one or more brake pads 105 comprise a base member 201, a plurality of protruding points 203, and a cover plate 205. The base member 201 functions as a foundation of the brake pad 105 and provides a surface whereby a brake pad 105 is secured to a hydraulic cylinder 103. The protruding points 203 are uniformly positioned on a surface of the base member 201 and create increased friction when in contact with the road surface. The cover plate 205 acts as a protective layer for the protruding points 203 providing structural support and protection against damage while the system is in use, ensuring their integrity and long-lasting performance. The cover plate 205 may further include a plurality of grooves 209 positioned between the plurality of protruding points 203 and configured to prevent buildup of dirt, gravel, sand, snow, ice, and other debris on the brake pads 105. The grooves 209 help prevent excessive wear to the brake pads 105 and also allows the brake pads 105 to function more effectively while in use.

Figure 4:
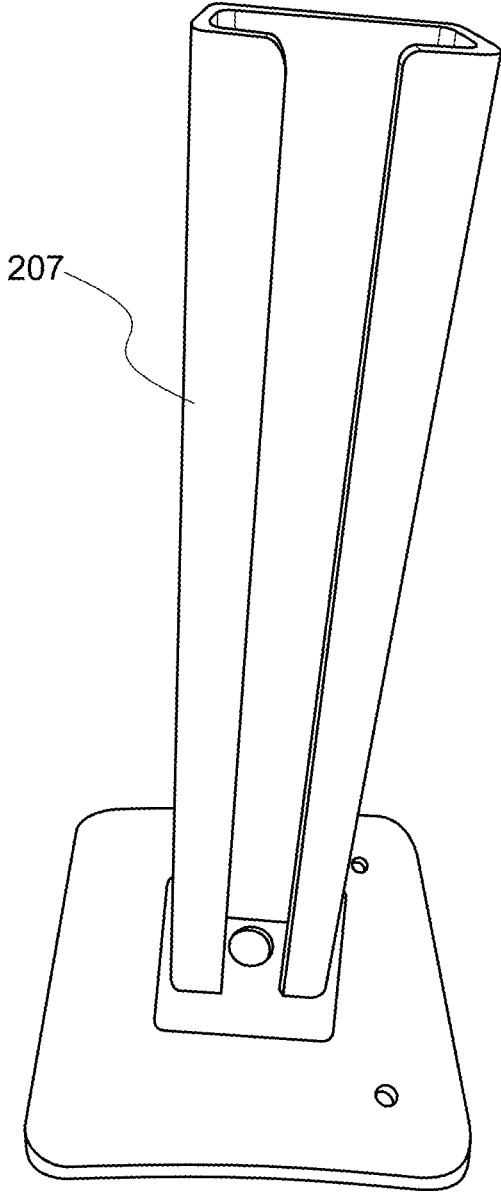
FIG. 4 illustrates an exemplary inner cylinder housing, in accordance with an aspect of the present disclosure.
Figure 5:
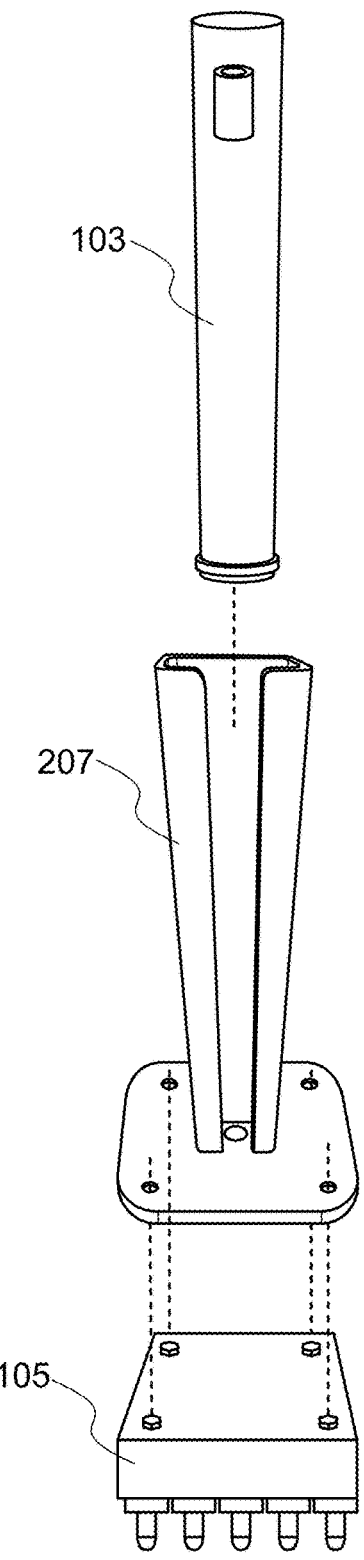
FIG. 5 is an exploded view of the hydraulic cylinder, brake pad, and inner cylinder housing, in accordance with an aspect of the present disclosure.
Figure 6:
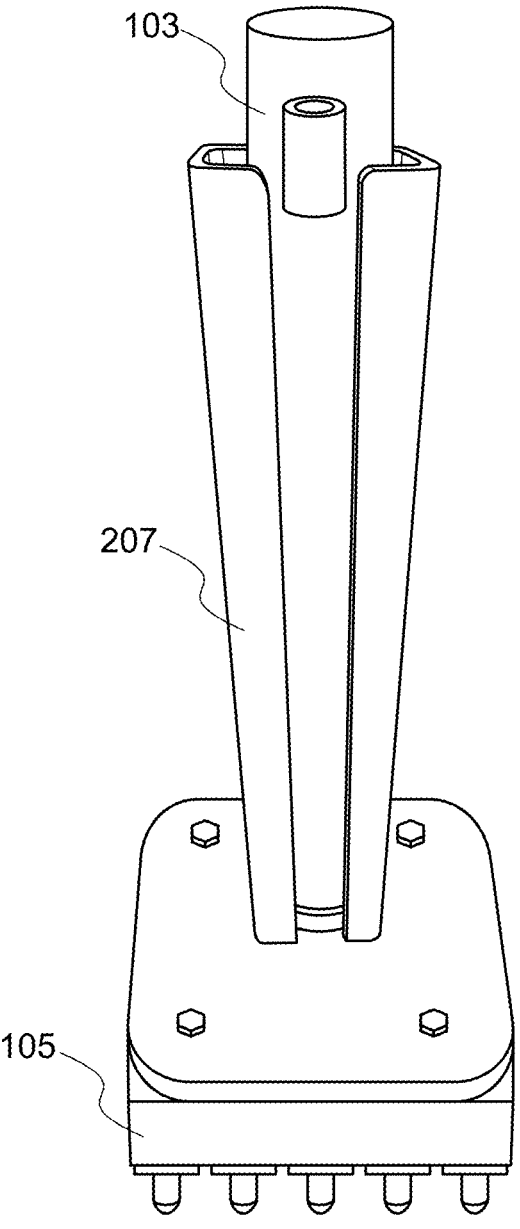
FIG. 6 is a perspective view of the hydraulic cylinder, brake pad, and inner cylinder housing, in accordance with an aspect of the present disclosure.
Figure 7:
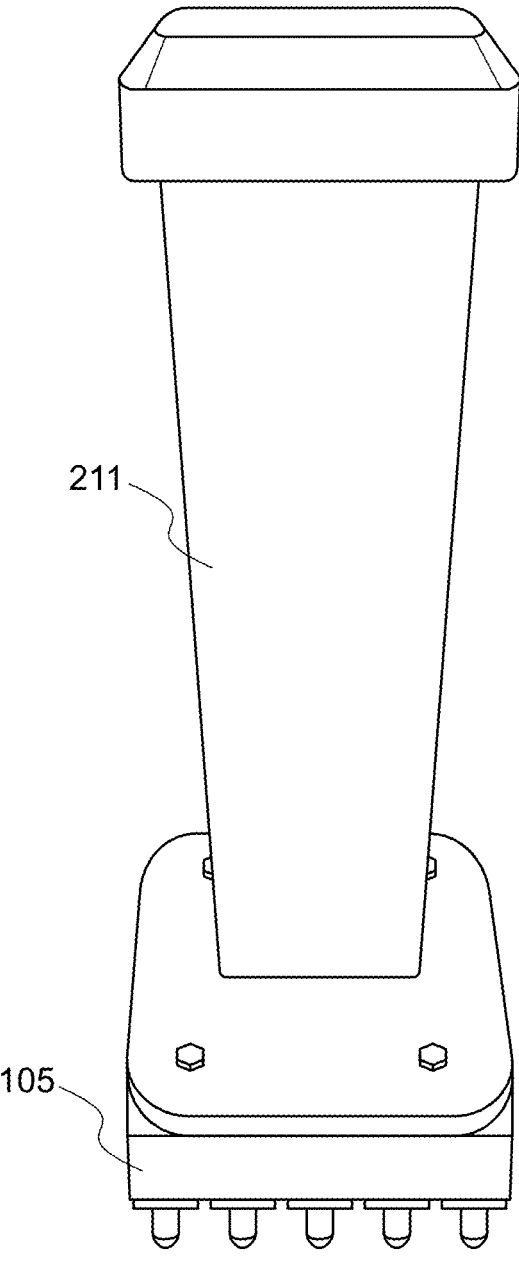
FIG. 7 is a perspective view of an exemplary outer cylinder housing, in accordance with an aspect of the present disclosure.

Each of the one or more hydraulic cylinders 103 are encased in a robust cylinder housing assembly comprising an inner cylinder housing unit 207 as shown in FIG. 4 and an outer cylinder housing unit 211 as shown in FIG. 7. The cylinder housing assembly serves to reinforce the hydraulic cylinders 103 and provide structural support and durability. This enhances the overall reliability and longevity of the braking system.

The control switch 107 is conveniently located within the driver's reach to engage and disengage the emergency braking system. This ensures quick access for the driver during critical situations where emergency braking may be required to enhance safety such as to regain control of the vehicle after losing traction. When the control switch 107 is engaged, it activates the one or more hydraulic cylinders 103 to extend the one or more brake pads 105. This action applies braking force to the vehicle, bringing it to a controlled stop. Once the emergency braking maneuver is complete, the driver can disengage the brake pads 105 with a disengagement button which retracts the brake pads 105, restoring normal vehicle operation.

The system works by first having the driver detect slippery road conditions or in the event of an emergency requiring immediate stopping power beyond what the conventional braking system can provide, the driver can press the brake engage button on control switch 107 to activate the emergency braking system. This action triggers the electrical hydraulic pumps 101, which in turn drives the hydraulic cylinders 103 to extend the brake pads 105 towards the ground.

The brake pads 105, once in contact with the road surface, create additional friction that aids in decelerating the vehicle more effectively than the standard braking system alone. The materials chosen for the brake pads ensure that this process is both efficient in stopping the vehicle and safe for the road surface, as well as the vehicle's structural integrity.

To disengage the emergency braking system and retract the brake pads 105, the driver presses the brake disengage button on control switch 107. This signals the hydraulic cylinders 103 to retract, allowing the brake pads 105 to return to their original position, and the vehicle to resume normal operation.

In some embodiments, the system may be retrofittable to existing vehicles, making it adaptable to a wide range of vehicle models without necessitating significant modifications. This ensures that the emergency braking system can be installed on existing vehicles, providing an enhanced safety feature that complements the vehicle's standard braking system.

The retrofittable nature of the emergency braking system allows for its integration into existing vehicles, offering a convenient and cost-effective solution to enhance safety without the need for extensive modifications. This feature makes the system adaptable to a wide range of vehicle models, including older vehicles that may not have advanced safety features. By retrofitting existing vehicles with this system, drivers can benefit from improved braking performance and reduced risk of accidents.

In other embodiments, the system may be installed in a vehicle during the manufacturing process. This approach allows automakers to include the system as a standard safety feature in new vehicles. By incorporating the emergency braking system into the vehicle's design, manufacturers can ensure optimal performance and reliability, as the system is seamlessly integrated with the vehicle's other safety features.

Various support and structural components may be required to assemble the system. For example, the system may be supported by steel washers, pins and bushes, hydraulic hoses, a mounting bracket for securing the system to the vehicle, wires, fusers, relay, solenoid fuse, hydraulic oil, fuse box 303, circuit breaker 305 and/or a power source 301 such as a 12V battery to power the entire system. In one embodiment, the power source 301 may be the vehicle battery. In one embodiment, the hydraulic pump 101 may be the vehicle power steering pump.

In one embodiment the hydraulic cylinders 103 may extend in the range of about 2 feet inches 8 inches and retract in the range of about 1 feet 6 inches. The brake pads 105 may be substantially rectangular shaped and may be in a range of about 10 to 10.5 inches by 8 to 8.5 inches. The protruding points 203 may be in the range of about 3 inches long and 0.5 to 1 inches in diameter.

The system may further include certain safety features such as a warning light and/or an alarm system to inform the driver when the emergency braking system is activated or if there is any malfunction within the system. The inclusion of a warning light and alarm serves to alert the driver of the system's engagement, ensuring that the driver is aware of the emergency braking system's activation and can adjust driving behavior accordingly. Additionally, these features provide critical feedback on the system's operational status, indicating any potential issues that may require attention.

It should be appreciated that for tests conducted, the emergency braking system was found to be significantly more effective at stopping vehicles on icy roads. For example, for testing that measured the stopping distance for a standard vehicle relative to speed, the difference in stopping distance for various speeds was measured using the vehicle's standard braking system and then again using the emergency braking system of the present disclosure. During testing, the speed of the vehicle was measured in miles per hour (MPH). The stopping distance was measured as the distance it takes for the vehicle to come to a complete stop after the brakes are applied. The data collected illustrated that the percentage improvement ranges from approximately 80-90% at lower speeds (20-30 MPH) and 85-90% at higher speeds (35-45 MPH) by using the emergency braking system vs. the standard braking system on an icy road. Furthermore, the stopping distances measured using the emergency braking system on an icy road were comparable to the stopping distances measured using the standard braking system on a normal roadway under ideal conditions. These tests and the data collected illustrate the effectiveness of the emergency braking system for stopping a vehicle under hazardous and dangerous conditions.

It should further be appreciated that the emergency braking system can stop the vehicle either quickly or slowly in response to the user's input to prevent rear end collisions. It should be further appreciated that the emergency braking system can be used to stabilize the vehicle if it has lost traction on an icy or slippery road for example. The user can apply the brake pad slightly to touch down on the road surface thus stabilizing the vehicle and allowing it to gain traction.

The emergency braking system described herein offers a novel approach to improving vehicular safety under challenging road conditions. Through its innovative design and operational features, this system provides an additional layer of protection for drivers, significantly reducing the risk of accidents due to slippery road surfaces. The detailed description provided above outlines the invention's components, operation, and safety features, ensuring that any person skilled in the art can replicate and utilize this emergency braking system.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible.

What is claimed is:

1. A vehicle emergency braking system, comprising:

one or more electric hydraulic pumps that generate hydraulic pressure;

one or more hydraulic cylinders mounted on an undercarriage of a vehicle and electrically connected to the one or more electric hydraulic pumps configured to extend and retract, wherein, when the braking system is activated, the one or more electric hydraulic pumps deliver high-pressure hydraulic fluid to the one or more hydraulic cylinders via hydraulic hoses to extend the one or more hydraulic cylinders and move one or more brake pads outward to make contact with a road surface, and wherein, when the braking system is deactivated, hydraulic pressure is reduced to retract the one or more hydraulic cylinders and move the one or more brake pads away from the road surface;

the one or more brake pads disposed on an extendable end of the one or more hydraulic cylinders, wherein each brake pad comprises:

a base member;

a plurality of protruding points extending from and connected to the base member;

a plate cover configured to secure the plurality of protruding points while allowing the points to extend beyond the plate cover surface; and a plurality of grooves formed in the plate cover and positioned between the protruding points to prevent debris buildup;

a control switch electrically connected to the one or more electric hydraulic pumps and configured to selectively extend and retract the one or more hydraulic cylinders in response to input from a user in distinct selectable operating modes including a first mode to rapidly deploy the brake pads to completely stop the vehicle and in a second mode to slightly touch down the brake pads on a road surface to stabilize the vehicle and allow it to gain traction, wherein the control switch is configured to provide precise electric hydraulic pressure control to achieve the first mode rapid deployment and the second mode slight touch down without compromising vehicle steering control during emergency conditions;

a power source; and wherein the vehicle emergency braking system defines a hydraulic actuation circuit comprising the electric hydraulic pumps, hydraulic cylinders, hydraulic hoses, and hydraulic fluid, and the vehicle braking system is devoid of pneumatic or compressed-gas actuation components for extending and retracting the hydraulic cylinders.

2. The vehicle emergency braking system of claim 1, wherein each of the one or more hydraulic cylinders is encased in a cylinder housing assembly.

3. The vehicle emergency braking system of claim 2, wherein the cylinder housing assembly comprises an inner cylinder housing unit and an outer cylinder housing unit.

4. The vehicle emergency braking system of claim 1, wherein the one or more hydraulic cylinders are mounted near a rear axle of the vehicle.

5. The vehicle emergency braking system of claim 1, wherein at least one of the one or more electric hydraulic pumps is a vehicle power steering pump.

6. The vehicle emergency braking system of claim 1, wherein the power source is the vehicle battery.

7. The vehicle emergency braking system of claim 1, wherein each of the one or more brake pads is substantially rectangular with dimensions of about 10 inches by 8 inches.

8. A method of braking a vehicle in an emergency, the method comprising:

providing the vehicle emergency braking system of claim 1;

detecting a loss of traction by the vehicle;

selectively engaging the one or more brake pads of the vehicle emergency braking system in response to the user input via the control switch by either rapidly deploying the one or more brake pads in the first mode by extending the brake pads towards a roadway surface until making contact with the roadway surface, or slightly touching down the brake pads in the second mode to stabilize the vehicle and allow it to gain traction, wherein engaging the brake pads comprises actuating the electrically driven hydraulic pump to deliver high-pressure hydraulic fluid through hydraulic hoses to the hydraulic cylinders to extend the hydraulic cylinders and move the brake pads outward to make contact with the roadway surface;

applying pressure from the brake pads in contact with the roadway surface until the vehicle regains traction or comes to a complete stop; and disengaging the one or more brake pads of the vehicle emergency braking system in response to the user input via the control switch, wherein disengaging comprises reducing hydraulic pressure in the hydraulic actuation circuit to retract the hydraulic cylinders so that the one or more brake pads retract towards the vehicle undercarriage until the one or more brake pads are no longer in contact with the roadway surface.

9. The method of braking a vehicle in an emergency of claim 8, further comprising the step of detecting a loss of traction by the vehicle.

* * * * *